(12) United States Patent
Kaul et al.

(10) Patent No.: US 11,593,511 B2
(45) Date of Patent: Feb. 28, 2023

(54) DYNAMICALLY IDENTIFYING AND REDACTING DATA FROM DIAGNOSTIC OPERATIONS VIA RUNTIME MONITORING OF DATA SOURCES

(71) Applicant: International Business Machines Corporation, Armonk, NY (US)

(72) Inventors: Akshar Kaul, Bangalore (IN); Manish Kesarwani, Bangalore (IN); Hong Min, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 16/598,440

(22) Filed: Oct. 10, 2019

(65) Prior Publication Data
US 2021/0110059 A1  Apr. 15, 2021

(51) Int. Cl.
| G06F 21/60 | (2013.01) |
| G06F 21/62 | (2013.01) |
| G06F 11/34 | (2006.01) |
| G06F 11/30 | (2006.01) |

(52) U.S. Cl.
CPC ........ *G06F 21/6245* (2013.01); *G06F 11/302* (2013.01); *G06F 11/3476* (2013.01); *G06F 21/6263* (2013.01)

(58) Field of Classification Search
CPC .......................... G06F 11/3476; G06F 11/3688
See application file for complete search history.

(56) References Cited

U.S. PATENT DOCUMENTS

| 6,823,203 | B2 | 11/2004 | Jordan |
| 7,152,244 | B2 | 12/2006 | Toomey |
| 7,546,334 | B2 | 6/2009 | Redlich et al. |
| 8,122,517 | B2 | 2/2012 | Julin et al. |
| 8,166,313 | B2 | 4/2012 | Fedtke |
| 8,346,532 | B2 | 1/2013 | Chakra et al. |
| 8,544,104 | B2 * | 9/2013 | Burke ............ G06F 21/60 726/26 |
| 8,639,896 | B2 | 1/2014 | Bank et al. |
| 8,930,327 | B2 | 1/2015 | Hossain et al. |
| 9,159,035 | B1 | 10/2015 | Ismael et al. |
| 9,251,339 | B2 | 2/2016 | Bullis et al. |

(Continued)

*Primary Examiner* — Duy Khuong T Nguyen
(74) *Attorney, Agent, or Firm* — Ryan, Mason & Lewis, LLP

(57) ABSTRACT

Methods, systems, and computer program products for identifying and redacting data from diagnostic operations via monitoring of data are provided herein. A computer-implemented method includes automatically monitoring data, which includes determining which portions of the data are accessed during a diagnostic operation; parsing an input file into portions of parsed data, wherein the input file comprises an initial output of the diagnostic operation; classifying the portions of parsed data into classes by applying at least one of multiple classification models to the parsed data, wherein the at least one classification model is specific to the accessed portions of data; automatically identifying sensitive data in the classified portions of parsed data by applying a class-to-sensitivity mapping technique to the classified portions of parsed data; redacting the identified sensitive data from the input file; and generating and outputting an updated output of the diagnostic operation based on the redacting.

15 Claims, 5 Drawing Sheets

(56) References Cited

U.S. PATENT DOCUMENTS

| | | | |
|---|---|---|---|
| 9,529,662 | B1 | 12/2016 | Wangkhem et al. |
| 9,548,986 | B2 | 1/2017 | Jung et al. |
| 2005/0066263 | A1* | 3/2005 | Baugher ............... G06N 5/025 |
| | | | 715/255 |
| 2006/0005017 | A1 | 1/2006 | Black et al. |
| 2006/0075228 | A1 | 4/2006 | Black et al. |
| 2010/0011000 | A1* | 1/2010 | Chakra ............... G06F 21/6209 |
| | | | 707/E17.005 |
| 2015/0113240 | A1 | 4/2015 | Abrams et al. |
| 2015/0302206 | A1 | 10/2015 | Averdunk et al. |
| 2017/0177907 | A1* | 6/2017 | Scaiano ................ G06N 7/005 |
| 2018/0173751 | A1 | 6/2018 | Gatto et al. |
| 2018/0232528 | A1* | 8/2018 | Williamson .......... G06F 16/285 |
| 2019/0065780 | A1 | 2/2019 | Joisha |
| 2019/0228183 | A1* | 7/2019 | Choi ...................... G06F 21/62 |
| 2020/0012811 | A1* | 1/2020 | Walters ............... G06F 11/3636 |
| 2020/0334376 | A1* | 10/2020 | Bragdon ............. G06F 21/6245 |

* cited by examiner

DYNAMICALLY IDENTIFYING AND REDACTING DATA FROM DIAGNOSTIC OPERATIONS VIA RUNTIME MONITORING OF DATA SOURCES

FIELD

The present application generally relates to information technology and, more particularly, to data management and security techniques.

BACKGROUND

Diagnostic operations, such as diagnostic dumps, are often carried out when a system faces one or more errors. The results of such operations are also often shared with third-party vendors in connection with problem resolution. However, sensitive and/or private data are generally included in the diagnostic operation (for example, as part of memory capture), and it is undesirable for such data to be shared. Removing or redacting too much data (e.g., all user-related data regardless of the status of such data as sensitive and/or private), however, can be disadvantageous because certain types and/or amounts of user data are often required for problem diagnosis.

SUMMARY

In one embodiment of the present invention, techniques for dynamically identifying and redacting data from diagnostic operations via runtime monitoring of data sources are provided. An exemplary computer-implemented method includes automatically monitoring one or more sets of data associated with a system, wherein automatically monitoring comprises determining which portions of the one or more sets of data are accessed during a diagnostic operation. Such a method also includes parsing an input file into two or more portions of parsed data, wherein the input file comprises an initial output of the diagnostic operation, and classifying the two or more portions of parsed data into one or more classes by applying at least one of multiple classification models to the two or more portions of parsed data, wherein the at least one classification model is specific to the accessed portions of data. Additionally, such a method further includes automatically identifying one or more items of sensitive data in the two or more classified portions of parsed data by applying a class-to-sensitivity mapping technique to the two or more classified portions of parsed data, redacting the one or more identified items of sensitive data from the input file, and generating and outputting, to at least one user, an updated output of the diagnostic operation based at least in part on the redacting.

In another embodiment of the invention, an exemplary computer-implemented method can include performing automatic runtime monitoring of data associated with a system, wherein automatically monitoring comprises determining which portions of the data are accessed during a diagnostic operation. Additionally, such a method can also include generating a report based at least in part on information pertaining to the one or more identified items of sensitive data redacted from the input file, and updating the at least one classification model based at least in part on the generated report.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes dynamically identifying and redacting data from diagnostic operations via runtime monitoring of data sources. At least one embodiment includes scanning at least one database to determine and/or identify identifiers to be run over the data in records pertaining to one or more diagnostic operations (e.g., a diagnostic dump), and utilizing one or more regulations to filter certain identifiers. Additionally, such an embodiment includes running identifiers based on encoding of the data, as well as checking the minimum length and/or maximum length of a column in the relevant database and running one or more of the identifiers only if the token is within a predetermined minimum/maximum length. Further, such an embodiment includes performing data-specific semantic checking to ensure that one or more combinations of identifiers are present in the database.

As detailed herein, an example embodiment includes identifying and redacting sensitive data from a diagnostic dump after the diagnostic dump has been performed and the results stored in at least one file. Such an embodiment includes monitoring the data sources (e.g., databases) from which the sensitive data that appears in the diagnostic dumps can originate. These data sources are monitored statically as well as dynamically to fine-tune the set of identifiers that should be run over the diagnostic dump to identify sensitive data. Static monitoring of data sources can include identifying metadata-based checks which are used to pre-filter tokens before running identifiers (e.g., directed identifiers and quasi-identifiers) thereon. Also, runtime monitoring of such data sources additionally uses the columns and rows of the database(s) that have been accessed (during the diagnostic dump) to fine-tune sensitive data identification. As further described herein, at least one embodiment includes validating that identified quasi-identifiers are semantically valid by using the data sources to verify the identified quasi-identifiers.

Figure 1:
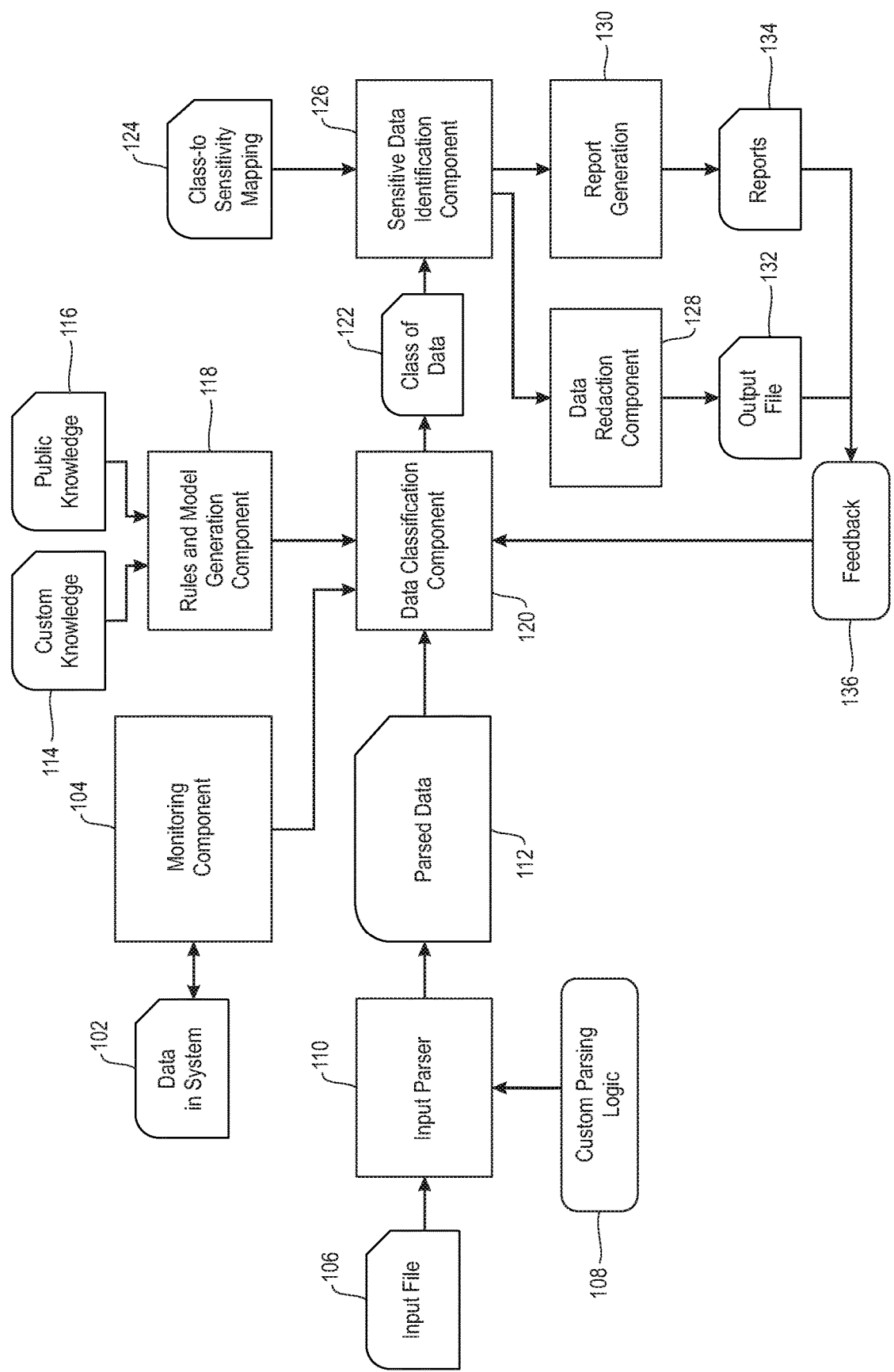
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an input file 106, which can include diagnostic dumps, logs, etc., and which can contain sensitive data. The input file 106 is provided to and/or obtained by an input parser 110, which parses the input file 106 to recognize portions of data therein. For example, a parsed output 112 can include free text and contextually-enriched data. The input parser 110 can implement address space logic, character set logic, and/or (user-provided) custom parsing logic 108.

As illustrated, FIG. 1 also depicts a data classification component 120, which classifies different parts of the parsed data 112 into various classes 122 (e.g., first name, credit card number, etc.) using rule-based techniques and/or models and learning-based techniques and/or models. In addition to the parsed data 112, input to the data classification component 120 includes outputs from a monitoring component 104 and outputs from a rules and model generation component 118. With respect to the rules and model generation component 118, custom knowledge 114 and public knowledge 116 are utilized to generate the rules, techniques, and/or models to be utilized by the data classification component 118. With respect to the monitoring component 104, the monitoring component 104 interacts with data sources 102 in the system in connection with static monitoring analysis and dynamic monitoring analysis.

Static analysis of the data sources can involve, for example, fine-tuning the rules and models to be run by the data classification component 120 against the parsed data 112. Such static analysis can include, for example, performing post-analysis on a diagnostic dump, instead of during monitoring while pieces of the diagnostic dump become available. Runtime monitoring of the data sources can involve, for example, monitoring the data sources to track what data has been accessed (e.g., during the diagnostic operation/dump in question), and instructing the data classification component 120 to run rules and models specific to that portion of data.

FIG. 1 also depicts a sensitive data identification component 126, which determines whether the class assignment 122 contains sensitive data and/or non-sensitive data. The sensitive data identification component 126 uses a class-to-sensitivity mapping 124 to analyze the classified data 122. Also, in at least one embodiment, the sensitive data identification component 126 implements direct identifiers and quasi-identifiers. As used herein, quasi-identifiers indicate situations wherein multiple classes should be present together, and in such embodiments, the nearness of data should be taken into consideration. The output of sensitive data identification component 126 includes data (from the classified data 122) tagged as sensitive or non-sensitive.

Additionally, FIG. 1 further depicts a data redaction component 128, which redacts the identified sensitive data from the input file 106. In one or more embodiments, various user-configurable methods can be implemented by the data redaction component 128, including, e.g., hashing, replacement, and encryption. Also, at least one embodiment includes ensuring, via the data redaction component 128, that the output file 132 generated by the data redaction component 128 is semantically and syntactically valid. For example, one or more embodiments include ensuring that the output file conforms to debugging requirements, including with respect to structure, layout, tags, etc.

FIG. 1 also depicts a report generation component 130, which generates and outputs one or more reports 134 based on levels and/or types of sensitivity of the data identified as sensitive. Such reports 134, in connection with the output file 132, can be used (e.g., by one or more users) to provide feedback 136 to the data classification component 120. For example, such feedback 136 can be used to update the specific rules and/or models, or the feedback 136 can be used as a pre-filter with high priority.

As detailed herein, at least one embodiment includes data source-specific identifier selection, which can include scanning one or more relevant databases to determine the identifiers that need to be run over the pertinent data in the records. For instance, if the data in question do not contain credit card numbers, then a credit card identifier should not be run over the data (e.g., the diagnostic dump). Additionally, in one or more embodiments, regulations (such as the General Data Protection Regulation (GDPR), the Health Insurance Portability and Accountability Act (HIPPA), the Payment Card Industry (PCI) Data Security Standard, etc.) can be utilized to filter certain identifiers (or certain types of identifiers) from the classification task in question. For example, if an identifier is not part of a given regulation, and the system is testing for that regulation, then there is no need to run that identifier as part of the classification task.

Also, one or more embodiments include metadata-specific identifier selection. In such an embodiment, data in a given data source and input file (e.g., diagnostic dump file) can be in mixed character sets (such as American Standard Code for Information Interchange (ASCII), Extended Binary Coded Decimal Interchange Code (EBCDIC), etc.), and identifiers can be selected and run based on the encoding of the data. For example, if "first name" is stored using ASCII and "last name" is stored using EBCDIC in a database, then if a string is identified via ASCII in the record, the system would have to run it against "first name" only.

Additionally, at least one embodiment includes determining and/or checking the minimum and maximum length of a column in a given database, and then running an identifier only if the token is within this length. By way of example, if all first names in the database are between 5 and 15 characters, and if a token of a length of 3 characters or a token of a length of 20 characters is identified, then the system does not need to run the "first name" identifier.

Also, one or more embodiments include data-specific semantic checking. With respect to quasi identifiers, such an embodiment includes ensuring that the prescribed combination of identifiers is present in the database. For example, if a combination of "first name" and "last name" constitutes a quasi-identifier, and if a record contains "John" and "Smith," but this combination is not in the database, then such data are not sensitive. Accordingly, such an embodiment includes first running the individual identifiers (e.g., "first name" and "last name") because data in a record can be in any order. Subsequently, such an embodiment includes performing a second level of data-specific semantic checking, which can be implemented, for example, via bloom filters.

As also detailed herein, at least one embodiment includes runtime monitoring of data sources. By way of illustration, the data in a diagnostic dump file are derived from some data source such as, for example, a given database. As such, runtime monitoring can include monitoring the data source to track what data has been accessed (by and/or during the diagnostic dump). For example, such an embodiment can include checking a query execution plan to determine which columns and/or datasets are accessed, which results in the system subsequently running classification rules and/or models specific to those columns and/or datasets. Similar runtime monitoring techniques can be carried out in connection with other data sources such as Virtual Storage Access Method (VSAM), etc.

Further, one or more embodiments include extending one or more of the techniques and/or components detailed herein to distributed systems. Such an embodiment can include processing input files (e.g., diagnostic dump files) generated in a distributed system, and the analysis can be handled via combining partial dumps and/or processing individual dumps.

Figure 2:
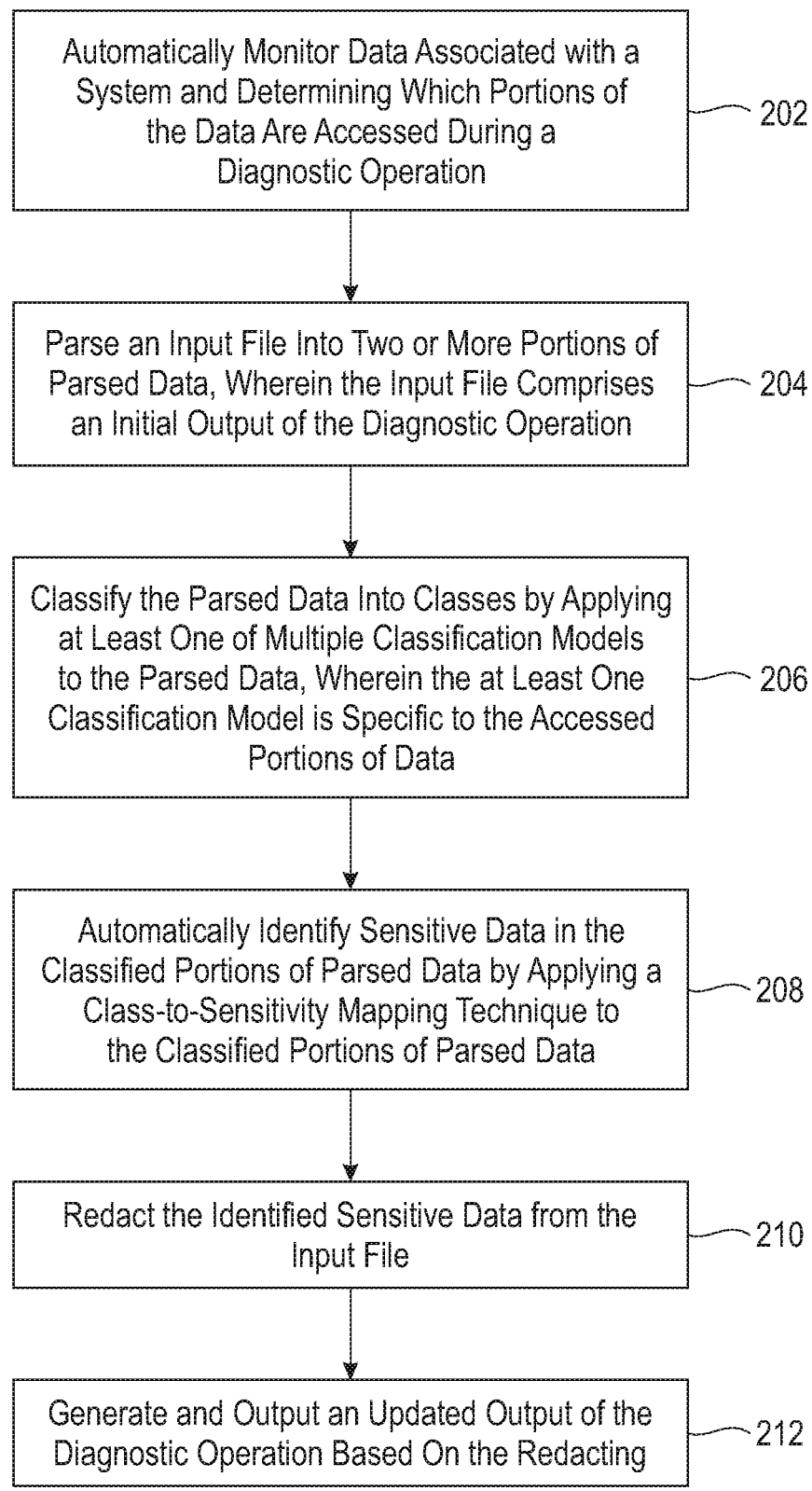
FIG. 2 is a flow diagram illustrating techniques according to an embodiment of the invention.

FIG. 2 is a flow diagram illustrating techniques according to an embodiment of the present invention. Step 202 includes automatically monitoring one or more sets of data associated with a system, wherein said automatically monitoring comprises determining which portions of the one or more sets of data are accessed during a diagnostic operation. In one or more embodiments, the one or more sets of data include diagnosis data generated or collected by one or more systems, middleware, and/or one or more applications in connection with diagnostic operation. Also, automatically monitoring can include identifying one or more metadata-based checks used for data pre-filtering in connection with the classifying step (i.e., step 206).

Step 204 includes parsing an input file into two or more portions of parsed data, wherein the input file comprises an initial output of the diagnostic operation. The two or more portions of parsed data can include (i) at least one portion of parsed data directed to free text and (ii) at least one portion of parsed data directed to contextually-enriched data. Also, in at least one embodiment, parsing can include implementing address space logic and/or implementing character set logic.

Step 206 includes classifying the two or more portions of parsed data into one or more classes by applying at least one of multiple classification models to the two or more portions of parsed data, wherein the at least one classification model is specific to the accessed portions of data. Also, the at least one classification model can be based at least in part on one or more minimum data length values and one or more maximum data length values.

Step 208 includes automatically identifying one or more items of sensitive data in the two or more classified portions of parsed data by applying a class-to-sensitivity mapping technique to the two or more classified portions of parsed data. Additionally, at least one embodiment includes fine-tuning one or more of the classification models based at least in part on the automatic monitoring. Also, applying the class-to-sensitivity mapping technique can include implementing (i) one or more direct sensitivity identifiers and (ii) one or more quasi sensitivity identifiers, wherein the one or more quasi sensitivity identifiers (i) require two or more particular classes being present together and (ii) consider nearness of data.

Step 210 includes redacting the one or more identified items of sensitive data from the input file. Redacting can include implementing one or more user-configurable redacting techniques comprising at least one of hashing, replacement, and encryption. Step 212 includes generating and outputting, to at least one user, an updated output of the diagnostic operation based at least in part on said redacting. Generating the updated output of the diagnostic operation can include ensuring that the updated output is semantically and syntactically valid.

Also, an additional embodiment of the invention includes performing automatic runtime monitoring of data associated with a system, wherein automatically monitoring comprises determining which portions of the data are accessed during a diagnostic operation. Additionally, such an embodiment can also include generating a report based at least in part on information pertaining to the one or more identified items of sensitive data redacted from the input file, and updating the at least one classification model based at least in part on the generated report.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
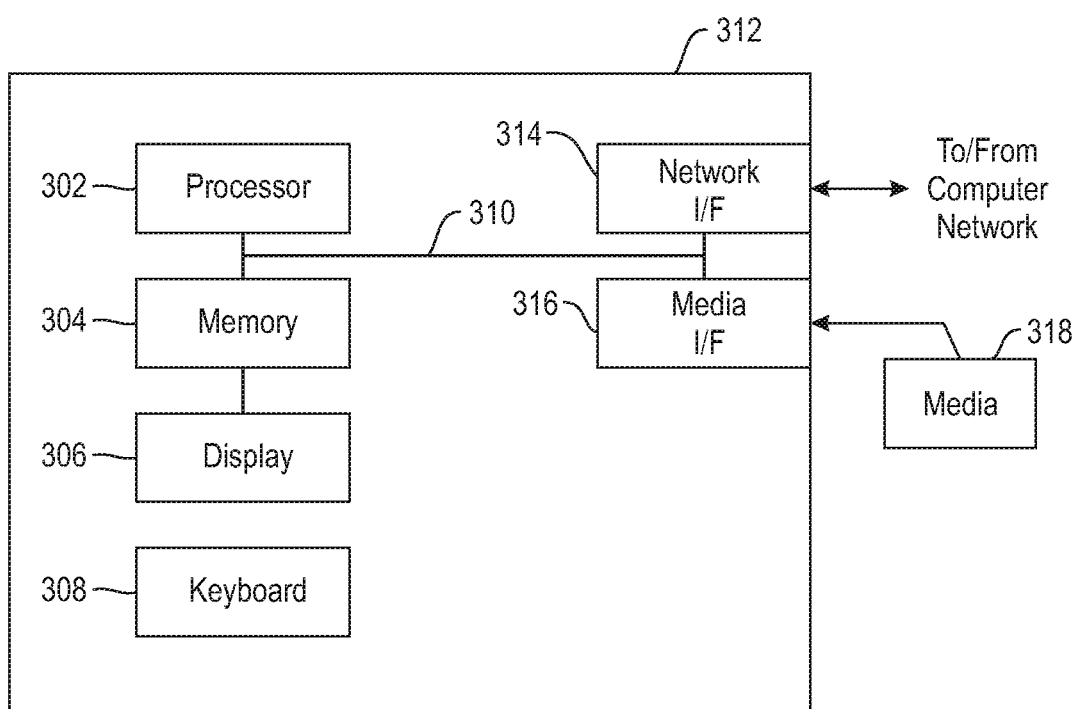
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312.

Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
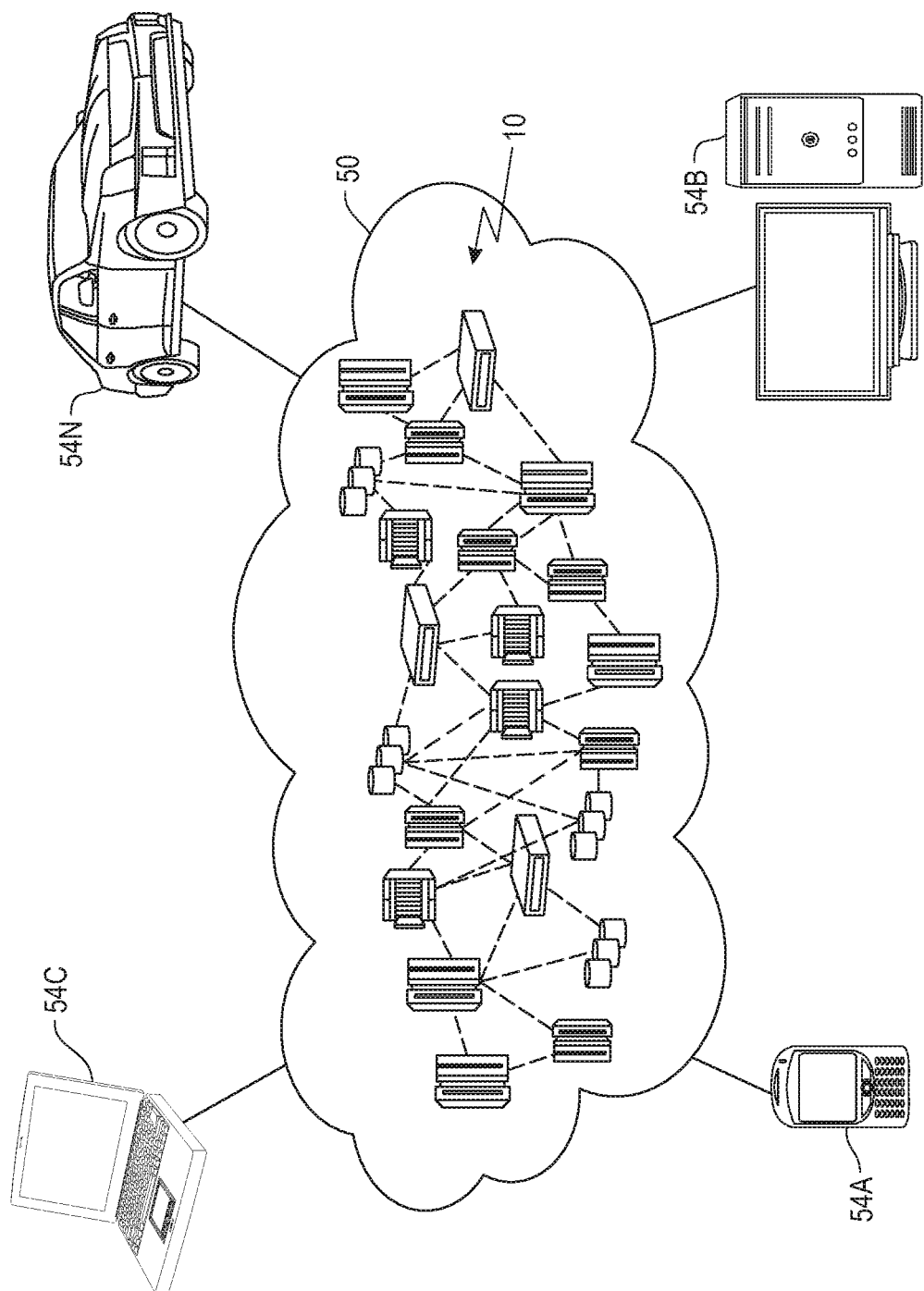
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
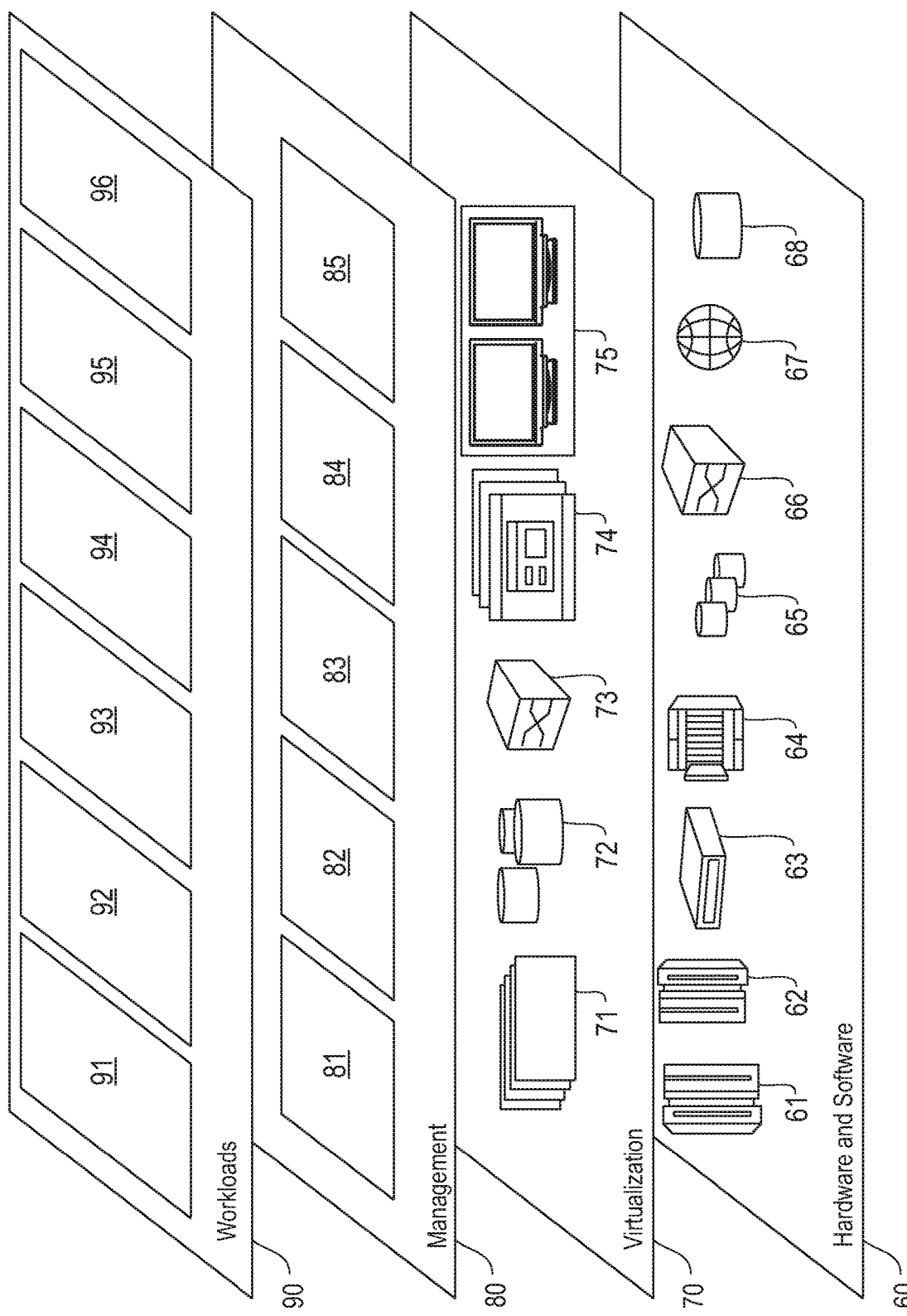
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic data identification and redaction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically identifying and redacting sensitive data from a diagnostic dump after the diagnostic dump has been performed and stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    automatically monitoring one or more sets of data associated with a system, wherein said automatically monitoring comprises determining which portions of the one or more sets of data are accessed during a diagnostic operation, and wherein the one or more sets of data are derived from at least one database;
    parsing an input file into two or more portions of parsed data, wherein the input file comprises an initial output of the diagnostic operation;

classifying the two or more portions of parsed data into one or more classes by applying at least one of multiple classification models to the two or more portions of parsed data, wherein the at least one classification model is specific to the accessed portions of data, and wherein the at least one classification model is based at least in part on one or more minimum data length values associated with one or more columns of the at least one database and one or more maximum data length values associated with the one or more columns of the at least one database;

automatically identifying one or more items of sensitive data in the two or more classified portions of parsed data by applying a class-to-sensitivity mapping technique to the two or more classified portions of parsed data, wherein said applying the class-to-sensitivity mapping technique comprises implementing (i) one or more direct sensitivity identifiers and (ii) one or more quasi sensitivity identifiers, and wherein the one or more quasi sensitivity identifiers (a) require two or more particular classes being present together and (b) require data from at least two of the two or more particular classes be within at least one given proximity of each other within the two or more classified portions of parsed data;

redacting the one or more identified items of sensitive data from the input file; and generating and outputting, to at least one user, an updated output of the diagnostic operation based at least in part on said redacting;

wherein the method is carried out by at least one computing device.

2. The computer-implemented method of claim 1, wherein the one or more sets of data comprise diagnosis data generated or collected by at least one of one or more systems, middleware, and one or more applications in connection with diagnostic operation.

3. The computer-implemented method of claim 1, wherein said automatically monitoring comprises identifying one or more metadata-based checks used for data pre-filtering in connection with said classifying.

4. The computer-implemented method of claim 1, comprising:
fine-tuning one or more of the classification models based at least in part on said automatically monitoring.

5. The computer-implemented method of claim 1, wherein the two or more portions of parsed data comprise (i) at least one portion of parsed data directed to free text and (ii) at least one portion of parsed data directed to contextually-enriched data.

6. The computer-implemented method of claim 1, wherein said parsing comprises implementing address space logic.

7. The computer-implemented method of claim 1, wherein said parsing comprises implementing character set logic.

8. The computer-implemented method of claim 1, wherein said redacting comprises implementing one or more user-configurable redacting techniques comprising at least one of hashing, replacement, and encryption.

9. The computer-implemented method of claim 1, wherein said generating the updated output of the diagnostic operation comprises ensuring that the updated output is semantically and syntactically valid.

10. A computer program product comprising a computer readable storage medium having program instructions embodied therewith, the program instructions executable by a computing device to cause the computing device to:

automatically monitor one or more sets of data associated with a system, wherein said automatically monitoring comprises determining which portions of the one or more sets of data are accessed during a diagnostic operation, and wherein the one or more sets of data are derived from at least one database;

parse an input file into two or more portions of parsed data, wherein the input file comprises an initial output of the diagnostic operation;

classify the two or more portions of parsed data into one or more classes by applying at least one of multiple classification models to the two or more portions of parsed data, wherein the at least one classification model is specific to the accessed portions of data, and wherein the at least one classification model is based at least in part on one or more minimum data length values associated with one or more columns of the at least one database and one or more maximum data length values associated with the one or more columns of the at least one database;

automatically identify one or more items of sensitive data in the two or more classified portions of parsed data by applying a class-to-sensitivity mapping technique to the two or more classified portions of parsed data, wherein said applying the class-to-sensitivity mapping technique comprises implementing (i) one or more direct sensitivity identifiers and (ii) one or more quasi sensitivity identifiers, and wherein the one or more quasi sensitivity identifiers (a) require two or more particular classes being present together and (b) require data from at least two of the two or more particular classes be within at least one given proximity of each other within the two or more classified portions of parsed data;

redact the one or more identified items of sensitive data from the input file; and generate and output, to at least one user, an updated output of the diagnostic operation based at least in part on said redacting.

11. The computer program product of claim 10, wherein said automatically monitoring comprises identifying one or more metadata-based checks used for data pre-filtering in connection with said classifying.

12. The computer program product of claim 10, wherein said generating the updated output of the diagnostic operation comprises ensuring that the updated output is semantically and syntactically valid.

13. A system comprising:
a memory; and
at least one processor operably coupled to the memory and configured for:
automatically monitoring one or more sets of data associated with a system, wherein said automatically monitoring comprises determining which portions of the one or more sets of data are accessed during a diagnostic operation, and wherein the one or more sets of data are derived from at least one database;
parsing an input file into two or more portions of parsed data, wherein the input file comprises an initial output of the diagnostic operation;
classifying the two or more portions of parsed data into one or more classes by applying at least one of multiple classification models to the two or more portions of parsed data, wherein the at least one classification model is specific to the accessed portions of data, and wherein the at least one classification model is based at least in part on one or more minimum data length values associated with one or more columns of the at least one database and one or more maximum data length values associated with the one or more columns of the at least one database;

automatically identifying one or more items of sensitive data in the two or more classified portions of parsed data by applying a class-to-sensitivity mapping technique to the two or more classified portions of parsed data, wherein said applying the class-to-sensitivity mapping technique comprises implementing (i) one or more direct sensitivity identifiers and (ii) one or more quasi sensitivity identifiers, and wherein the one or more quasi sensitivity identifiers (a) require two or more particular classes being present together and (b) require data from at least two of the two or more particular classes be within at least one given proximity of each other within the two or more classified portions of parsed data;

redacting the one or more identified items of sensitive data from the input file; and generating and outputting, to at least one user, an updated output of the diagnostic operation based at least in part on said redacting.

14. The system of claim 13, wherein said automatically monitoring comprises identifying one or more metadata-based checks used for data pre-filtering in connection with said classifying.

15. A computer-implemented method comprising:

performing automatic runtime monitoring of data associated with a system, wherein said automatically monitoring comprises determining which portions of the data are accessed during a diagnostic operation, and wherein the data are derived from at least one database;

parsing an input file into two or more portions of parsed data, wherein the input file comprises an initial output of the diagnostic operation;

classifying the two or more portions of parsed data into one or more classes by applying at least one of multiple classification models to the two or more portions of parsed data, wherein the at least one classification model is specific to the accessed portions of data, and wherein the at least one classification model is based at least in part on one or more minimum data length values associated with one or more columns of the at least one database and one or more maximum data length values associated with the one or more columns of the at least one database;

automatically identifying one or more items of sensitive data in the two or more classified portions of parsed data by applying a class-to-sensitivity mapping technique to the two or more classified portions of parsed data, wherein said applying the class-to-sensitivity mapping technique comprises implementing (i) one or more direct sensitivity identifiers and (ii) one or more quasi sensitivity identifiers, and wherein the one or more quasi sensitivity identifiers (a) require two or more particular classes being present together and (b) require data from at least two of the two or more particular classes be within at least one given proximity of each other within the two or more classified portions of parsed data;

redacting the one or more identified items of sensitive data from the input file;

generating and outputting, to at least one user, an updated output of the diagnostic operation based at least in part on said redacting;

generating a report based at least in part on information pertaining to the one or more identified items of sensitive data redacted from the input file; and updating the at least one classification model based at least in part on the generated report;

wherein the method is carried out by at least one computing device.

* * * * *